(12) United States Patent
Huang

(10) Patent No.: US 8,984,994 B2
(45) Date of Patent: Mar. 24, 2015

(54) CONNECTION UNIT FOR CONNECTING SAW BLADE TO HANDLE

(76) Inventor: Yin Han Huang, Taichung (TW)

(*) Notice: Subject to any disclaimer, the term of this patent is extended or adjusted under 35 U.S.C. 154(b) by 454 days.

(21) Appl. No.: 13/589,122

(22) Filed: Aug. 18, 2012

(65) Prior Publication Data

US 2014/0047958 A1 Feb. 20, 2014

(51) Int. Cl.
*B25G 3/26* (2006.01)
*B25F 1/02* (2006.01)
*B23D 49/10* (2006.01)

(52) U.S. Cl.
CPC ... *B25G 3/26* (2013.01); *B25F 1/02* (2013.01); *B23D 49/10* (2013.01)
USPC .............................................. 81/491; 30/507

(58) Field of Classification Search
CPC .............. B25G 3/26; B25G 3/06; B25G 3/08; B25F 1/02; B23D 49/12; B23D 51/125; B23D 51/14
USPC ........... 81/491, 487, 489; 7/149, 158; 30/502, 30/503, 507, 510, 513, 514, 517, 520, 523
See application file for complete search history.

(56) References Cited

U.S. PATENT DOCUMENTS

| 4,835,869 | A  | * | 6/1989 | Waldherr | 30/507 |
| 8,613,146 | B2 | * | 12/2013 | Ebner | 30/507 |
| 2004/0187219 | A1 | * | 9/2004 | Beal | 7/158 |
| 2009/0084233 | A1 | * | 4/2009 | Rosso et al. | 81/491 |

* cited by examiner

*Primary Examiner* — Robert Scruggs

(57) ABSTRACT

A hand tool includes a handle and a holding member is connected to the front end of the handle. A first part is connected to one end of the holding member and is connected to a second part connected to the front end of the handle. The first part has a first recess defined transversely therethrough. A second recess and a third recess are respectively in one side of the first part and communicate with the first recess. The second recess is located between the first and third recesses. A control unit has two pins which are movably cooperated with the first, second and the third recesses. The second pin is connected to the first pin. When pushing the first pin toward the second pin, the first part is shifted from the second part so that a blade is inserted into or removed from the first and second parts.

6 Claims, 7 Drawing Sheets

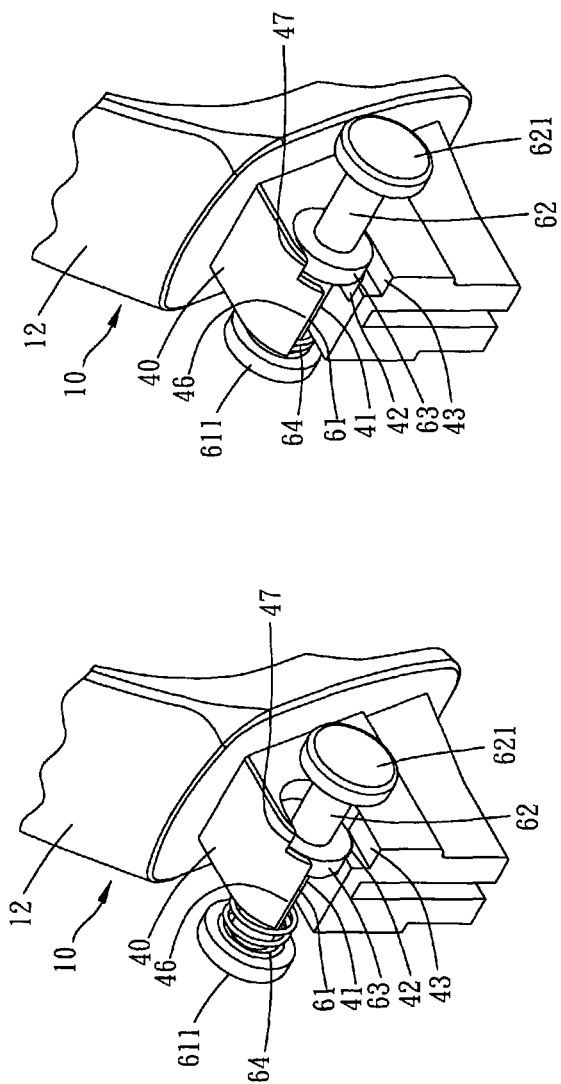

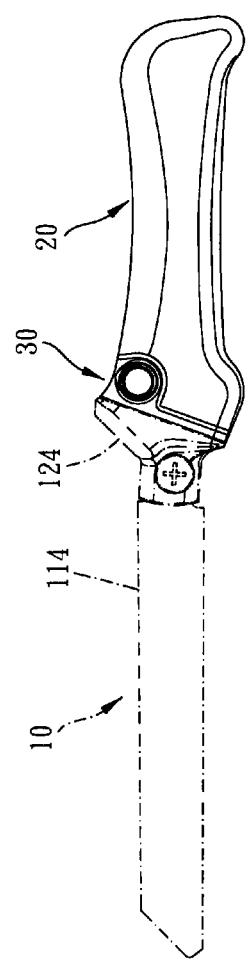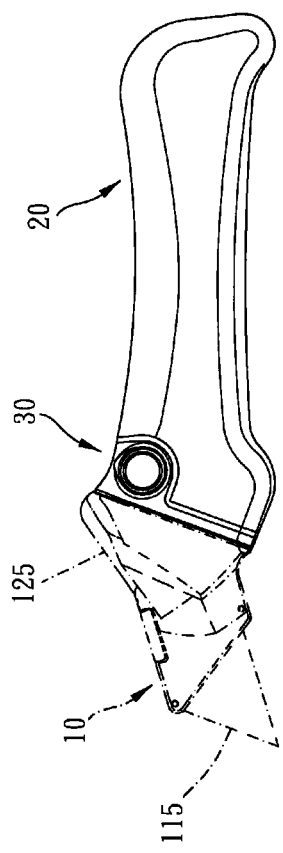

CONNECTION UNIT FOR CONNECTING SAW BLADE TO HANDLE

FIELD OF THE INVENTION

The present invention relates to a hand tool, and more particularly, to a connection unit for connecting the blade to the handle.

BACKGROUND OF THE INVENTION

The conventional hand tools are required to be compact and easily used. One of the hand tools comprises a handle to which different types of blades, screw bits or sockets are connected. In order to secure the screw bit to the handle such that when rotating the handle, the screw bit is not rotated independently from the handle, the connection unit is required to secure the screw bit to the handle in the rotational direction. In the meanwhile, the screw bit should be easily removed from the handle in the axial direction.

For blades such as the saw blades, because the saw blades are operated in the axial direction of the handle, so that the connection unit is required to ensure that the saw blades are not loosened from the handle when using the saw blades.

The present invention intends to provide a hand tool with a connection unit which securely connects the saw blade to the handle.

SUMMARY OF THE INVENTION

The present invention relates to a hand tool and comprises a handle having a holding member connected to the front end thereof. A first part is connected to one end of the holding member and has a first recess, a second recess and a third recess, wherein the first recess is defined transversely through the first part. The second recess is located beside the first recess and communicates with the first recess. The third recess is defined in one side of the first part and communicates with the second recess which is located between the first and third recesses. A first opening is defined in one end of the first part and communicates with the first and second recesses. A second opening is defined in the end of the first part and communicates with the third recess. The width of the first opening is at least equal to the inner diameter of the first recess and smaller than the inner diameter of the second recess. The width of the second opening is larger than the inner diameter of the third recess.

A second part is connected to the front end of the handle and has a space to receive the first part therein. The second part has a first hole and a second hole respectively defined in two sides thereof. A control unit has a first pin, a second pin, a ring and a spring, wherein the spring is mounted to the first pin and the first pin extends through the first hole. The spring is biased between the first head of the first pin and the outside of the first hole. The second pin extends through the second hole and is connected to the first pin. The ring is clamped between the first and second pins. The ring is movably engaged with the second recess in the first part. The ring is removed from the second recess and moved into the third recess when the first pin is pushed and the first part is disengaged from the second part.

The primary object of the present invention is to provide a connection unit for connecting he blade to the hand tool, wherein the blade is restricted in both axial and radial directions by the connection unit.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 7 is a perspective view to show that the first pin is not yet pushed toward the second pin;

FIG. 8 is a perspective view to show that the first pin is pushed toward the second pin;

FIG. 11 shows that a jig saw blade is connected to the hand tool by the connection unit of the present invention, and FIG. 12 shows a blade is connected to the hand tool by the connection unit of the present invention.

DETAILED DESCRIPTION OF THE PREFERRED EMBODIMENT

Figure 1:
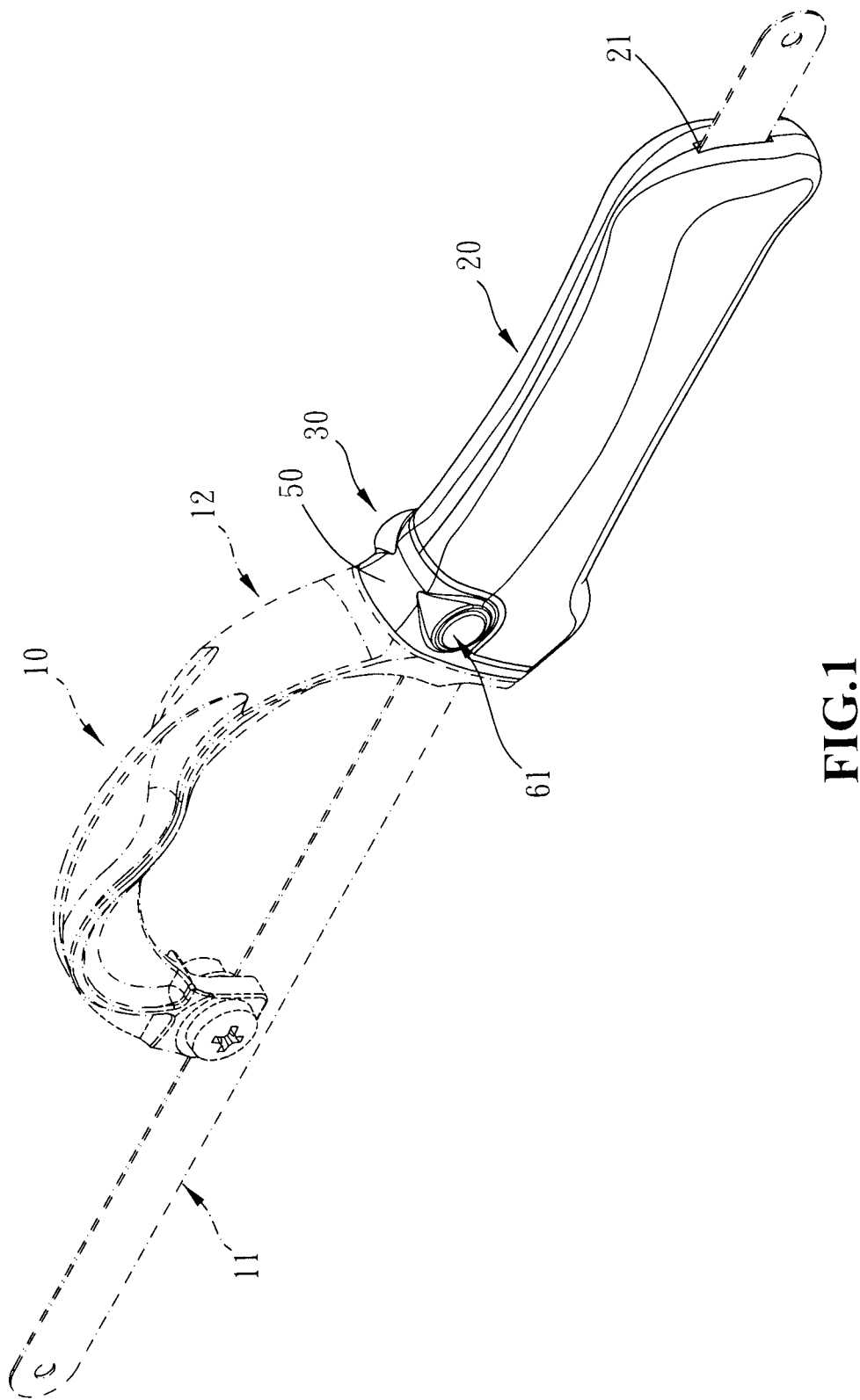
FIG. 1 is a perspective view to show the hand tool with the connection unit of the present invention.

Referring to FIGS. 1 to 4, the hand tool 10 of the present invention comprises a handle 20 and a holding member 12 is connected to the front end of the handle 20 so that a tool 11 such as a jaw blade 111 is connected to the holding member 12 and the handle 20.

The connection unit 30 of the present invention comprises a first part 40, a second part 50 and a control unit 60, wherein the first part 40 is connected to one end of the holding member 12 and the second part 50 is connected to the front end of the handle 20. It is also within the range of the present invention to exchange the positions of the first and second parts 40, 50. The control unit 60 is used to connect the first par 40 to the second part 50.

The first part 40 is substantially a rectangular block and comprises a first recess 41, a second recess 42 and a third recess 43. The first recess 41 is defined transversely through the first part 40. The second recess 42 is located beside the first recess 41 and communicates with the first recess 41. The third recess 43 is defined in one side of the first part 40 and communicates with the second recess 42 which is located between the first and third recesses 41, 43. Two respective inner diameters of the second and third recesses 42, 43 are larger than the inner diameter of the first recess 41. A first opening 46 is defined in one end of the first part 40 and communicates with the first and second recesses 41, 42. A second opening 47 is defined in the end of the first part 40 and communicates with the third recess 43. In other words, the first and third recesses 41, 43 respectively communicate the two sides of the first part 40. The width "L1" of the first opening 46 is equal to or larger than the inner diameter of the first recess 41 and smaller than the inner diameter of the second recess 42. The width "L2" of the second opening 47 is larger than the inner diameter of the third recess 43.

The second part 50 is connected to the front end of the handle 20 and has a space 51 defined therein. The second part 50 has an entrance which communicates with the space 51 so that the first part 40 is accommodated in the space 51 via the entrance. A first hole 53 and a second hole 54 are respectively defined in two sides of the second part 50.

Figure 5:
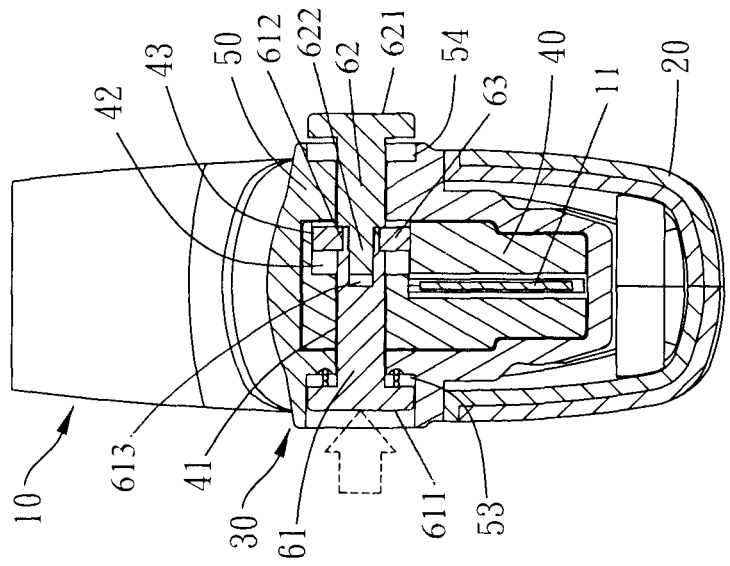
FIG. 5 is a cross sectional view taken along line 5-5 in FIG. 4.
Figure 6:
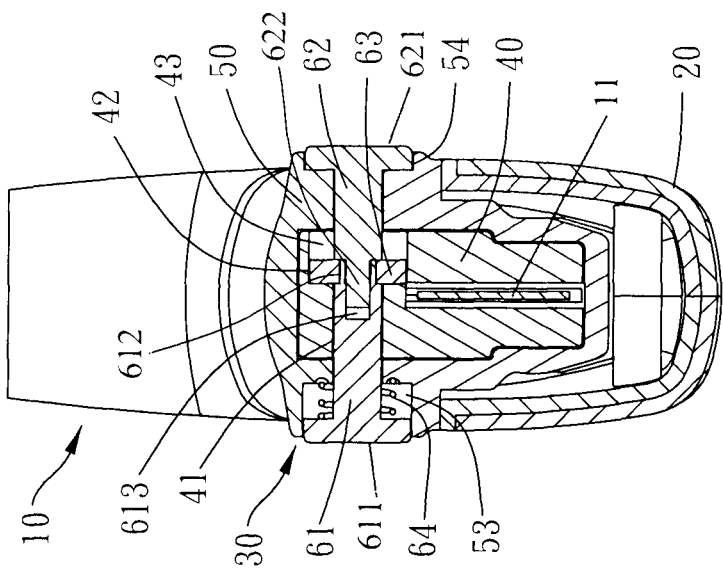
FIG. 6 is a cross sectional view to show that the first pin is pushed toward the second pin.

The control unit 60 has a first pin 61, a second pin 62, a ring 63 and a spring 64. The spring 64 is mounted to the first pin 61 and the first pin 61 extends through the first hole 53. The outer diameter of the first pin 61 is equal to or slightly smaller than the inner diameter of the first recess 41 of the first part 40. The outer diameter of the ring 63 is identical to the inner diameter of the second and third recesses 42, 43. The first pin 61 has an enlarged first head 611 and a narrowed first distal end 612. The second pin 62 has an enlarged second head 621 and a narrowed second distal end 622. The spring 64 is biased between a first head 611 of the first pin 61 and the outside of the first hole 53. The second pin 62 extends through the second hole 54 and the second distal end 622 of the second pin 62 is securely connected to the hole 613 in the first distal end 612 of the first pin 61 by a known method such as threading or force-fit as shown in FIG. 5. The ring 63 is clamped between the first and second pins 61, 62.

As shown in FIGS. 5 to 8, when installing the tool 10 to the second part 50, the first pin 61 is pushed toward the second pin 62 to compress the spring 64, the first and second pins 61, 62 together with the ring 63 are moved. The first part 40 is then inserted into the space 51 of the second part 50. The movement of the first and second pins 61, 62 makes the ring 63 to move to a position corresponding to the third recess 43. Because the outer diameter of the first pin 61 is equal to or slightly smaller than the inner diameter of the first recess 41 of the first part 40, and the width "L1" of the first opening 46 is equal to or larger than the inner diameter of the first recess 41, so that the first part 40 can be easily inserted into the space 51 of the second part 50. The user then releases the first pin 61, the spring 64 brings the first and second pins 61, 62 together with the ring 63 back to their initial positions. The ring 63 is again received in the second recess 42. Because the width "L1" of the first opening 46 is smaller than the inner diameter of the second recess 42, so that the ring 63 performs as a stop, and the first part 40 is not disengaged from the second part 50 in the axial direction. The tool 10 is then connected to the handle 20.

When removing the tool 10 from the handle 20, the user pushes the first pin 61 toward the second pin 62 to compress the spring 64, the first and second pins 61, 62 together with the ring 63 are moved. The ring 63 is moved from the second recess 42 to the third recess 43. Because the width "L2" of the second opening 47 is larger than the inner diameter of the third recess 43 of the first part 40, so that the ring 63 cannot stop the first part 40 which can be disengaged from the second part 50 in the axial direction of the second part 50. When first part 40 is disengaged from the second part 50, the first pin 61 is released and the spring 64 brings the first and second pins 61, 62 together with the ring 63 back to their initial positions.

Figure 9:
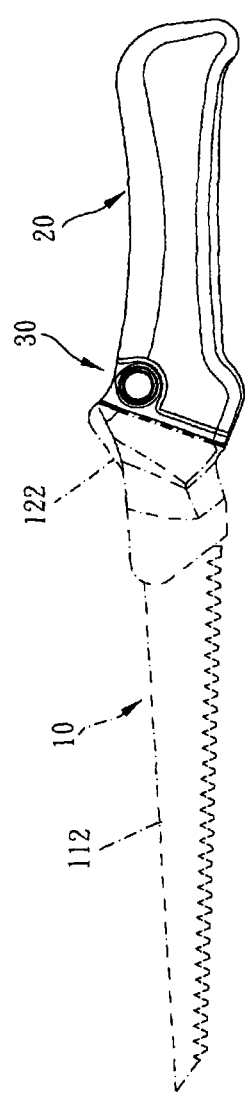
FIG. 9 shows that a short saw blade is connected to the hand tool by the connection unit of the present invention.
Figure 10:
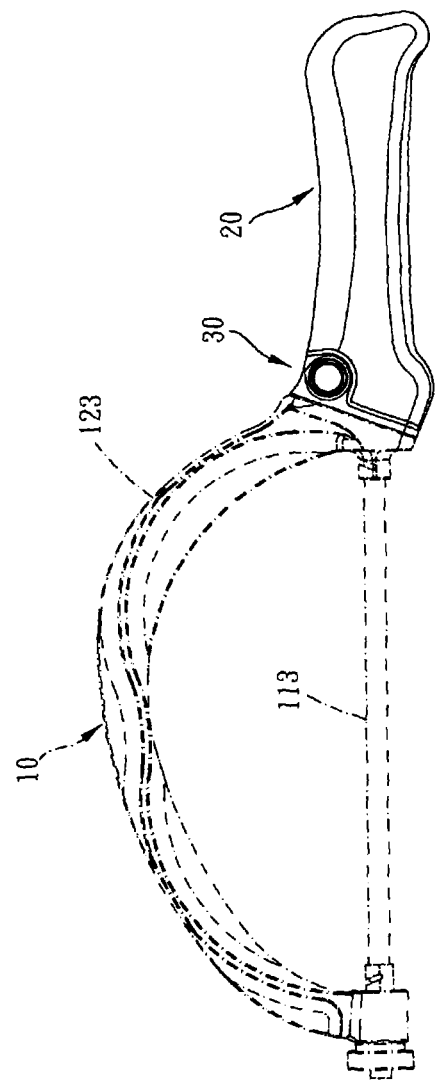
FIG. 10 shows that a saw blade is connected to the hand tool by the connection unit of the present invention, the hand tool is used as a coping saw.

FIGS. 1 to 8 show that a long saw blade 111 is installed to the holding member 12. FIG. 9 shows that a short saw blade 112 is connected to the holding member 12 and FIG. 10 shows that a saw blade 113 is connected to the holding member 123 and the hand tool is used as a coping saw. FIG. 11 shows that a jig saw blade 114 is connected to the holding member 124. FIG. 12 shows a blade 115 is connected to the holding member 125.

Figures 2, 3:
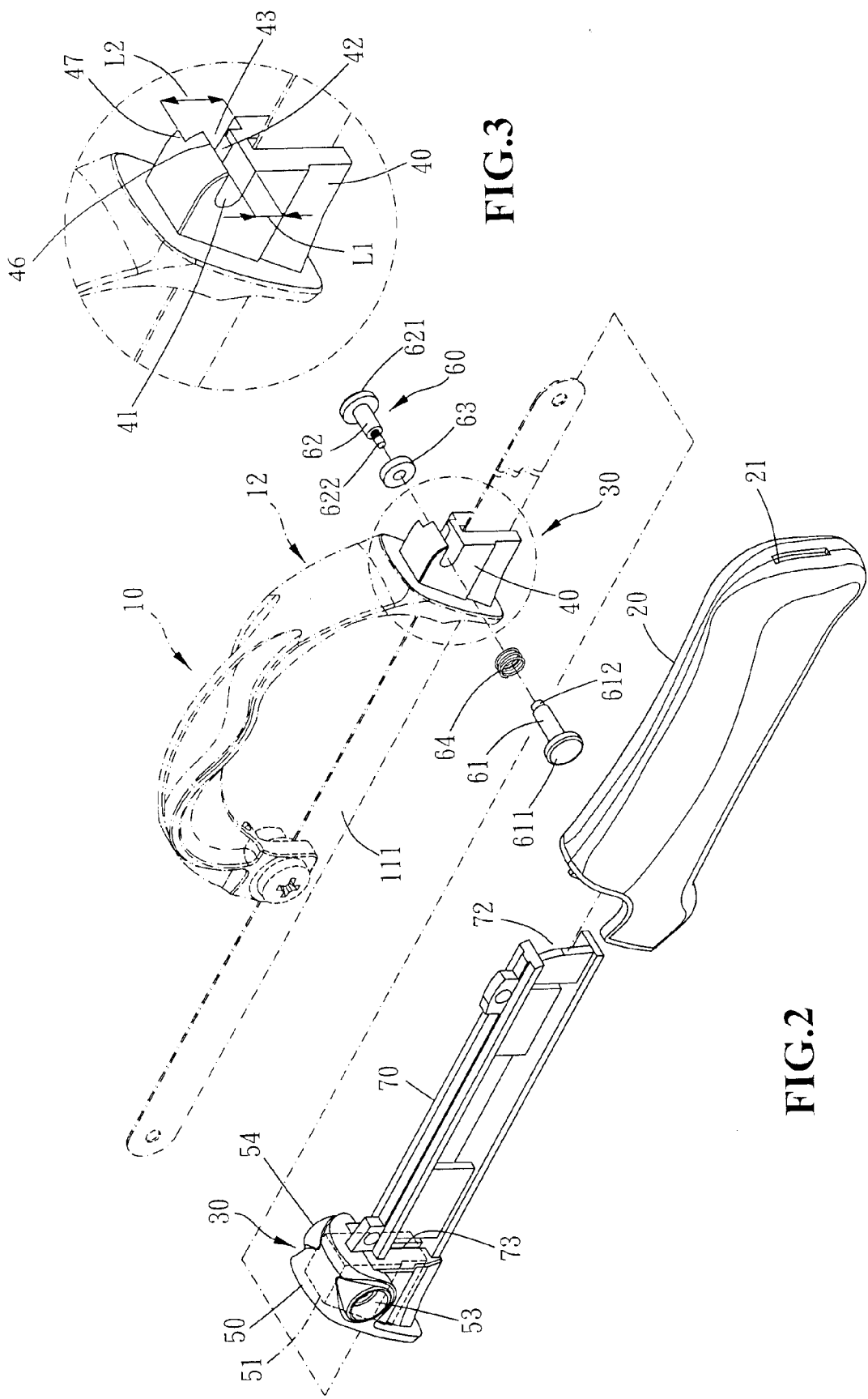
FIG. 2 is an exploded view to show the hand tool with the connection unit of the present invention.
FIG. 3 is an enlarged view to show the first part of the connection unit of the present invention.
Figure 4:
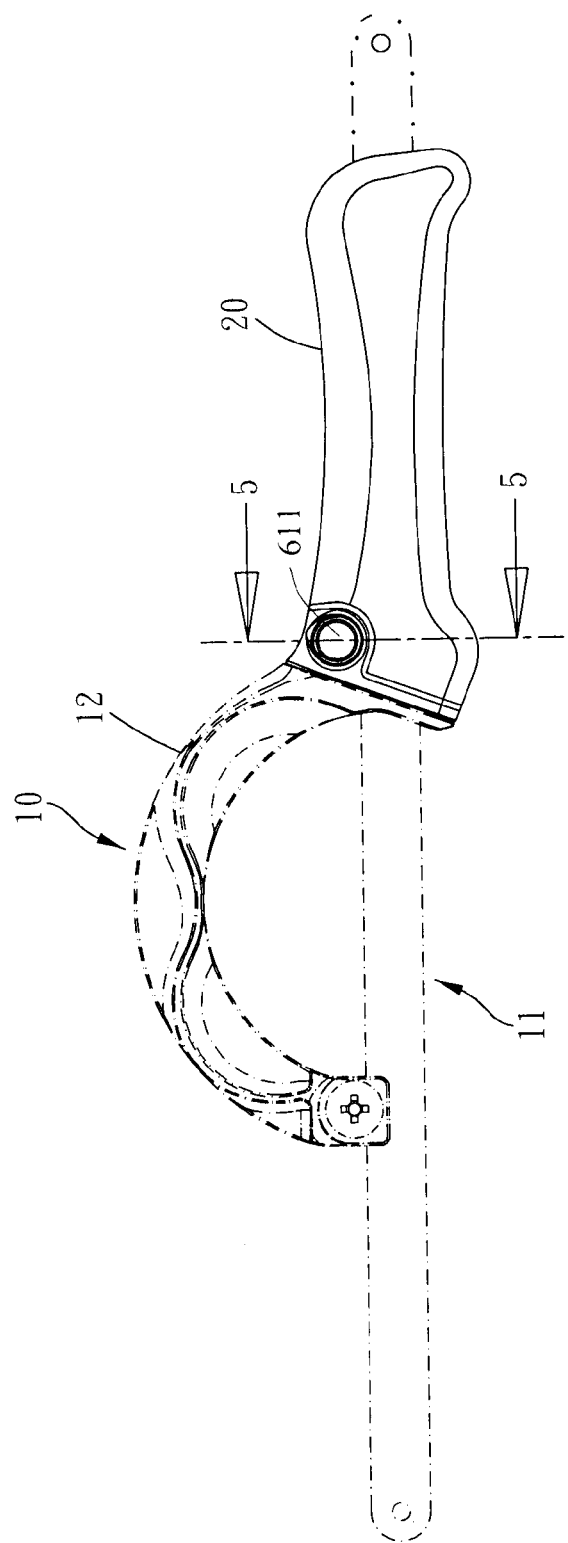
FIG. 4 is a side view of the hand tool with the connection unit of the present invention.

Further referring to FIGS. 1 and 2, an extension portion 70 extends from the second part 50 and a groove 72 is defined axially in the extension portion 70. The extension portion 70 is inserted into the handle 20. The groove 72 communicates with the second part 50 via a through hole 73 so that the long saw blade 111 extends through the through hole 73 and is inserted into the groove 72. A rear hole 21 is defined through the rear end of the handle 20 so that the long saw blade 11 extends through the rear hole 21.

While we have shown and described the embodiment in accordance with the present invention, it should be clear to those skilled in the art that further embodiments may be made without departing from the scope of the present invention.

What is claimed is:

1. A hand tool comprising:
a handle having a holding member connected to a front end thereof;
a first part connected to one end of the holding member and having a first recess, a second recess and a third recess, the first recess defined transversely through the first part, the second recess located beside the first recess and communicating with the first recess, the third recess defined in a side of the first part and communicating with the second recess which is located between the first and third recesses, two respective inner diameters of the second and third recesses being larger than an inner diameter of the first recess, a first opening defined in an end of the first part and communicating with the first and second recesses, a second opening defined in the end of the first part and communicating with the third recess, a width of the first opening being at least equal to the inner diameter of the first recess and being smaller than the inner diameter of the second recess, a width of the second opening being larger than the inner diameter of the third recess;
a second part connected to the front end of the handle and having a space defined therein, the second part having an entrance which communicates with the space so that the first part is accommodated in the space via the entrance, a first hole and a second hole respectively defined in two sides of the second part;
a control unit having a first pin, a second pin, a ring and a spring, the spring mounted to the first pin and the first pin extending through the first hole, the spring being biased between a first head of the first pin and an outside of the first hole, the second pin extending through the second hole and connected to the first pin, the ring being clamped between the first and second pins, the ring being movably engaged with the second recess in the first part, the ring being removed from the second recess and moved into the third recess when the first pin being pushed and the first part is disengaged from the second part.

2. The hand tool as claimed in claim 1, wherein the two respective inner diameters of the second and third recesses are identical.

3. The hand tool as claimed in claim 1, wherein the first head of the first pin is an enlarged head and the first pin has a narrowed first distal end, the second pin has an enlarged second head and a narrowed second distal end, the second distal end of the second pin is securely connected to the first distal end of the first pin.

4. The hand tool as claimed in claim 1, wherein an extension portion extends from the second part and a groove is defined axially in the extension portion, the extension portion is inserted into the handle.

5. The hand tool as claimed in claim 1, wherein a rear hole is defined in a rear end of the handle.

6. The hand tool as claimed in claim 1, wherein the first part is substantially rectangular block.

* * * * *